(12) United States Patent
Singh et al.

(10) Patent No.: US 6,208,331 B1
(45) Date of Patent: Mar. 27, 2001

(54) CLEANING TOUCHSCREENS

(75) Inventors: Mona Singh, Cary; Billy Gayle Moon, Apex, both of NC (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/108,470

(22) Filed: Jul. 1, 1998

(51) Int. Cl.[7] ................................................ G09G 5/00
(52) U.S. Cl. ........................................ 345/173; 345/156
(58) Field of Search ..................................... 345/173–178

(56) References Cited

U.S. PATENT DOCUMENTS

| | | | |
|---|---|---|---|
| 4,992,779 | 2/1991 | Sugino et al. | 340/712 |
| 5,526,422 | 6/1996 | Keen | 379/396 |
| 5,537,106 * | 7/1996 | Mitsuhashi | 340/825.72 |

FOREIGN PATENT DOCUMENTS 8-263215  11/1996  (JP) ............................... G06F/3/033

\* cited by examiner

Primary Examiner—Amare Mengistu
Assistant Examiner—Jimmy H. Nguyen
(74) Attorney, Agent, or Firm—Wood, Phillips, VanSanten, Clark & Mortimer

(57) ABSTRACT

A method for cleaning a touch screen display in a touch screen device without inadvertently activating a feature or inputting unwanted data by touching the touch screen display. The method operates by entering a clean touch screen mode wherein individual touches of the touch screen display are not recognized by the touch screen device. This allows the user to clean the touch screen display by wiping it with a cloth without inadvertently activating a feature or inputting unwanted data. The touch screen display turns bright white when it is in the clean touch screen mode to illuminate dirt and oil on the touch screen display to allow for easier cleaning of the touch screen display. The touch screen device exits the clean touch screen mode in response to input from the user. The user can depress any key on a keyboard attached to the touch screen device or the user can simultaneously touch opposite corners of the touch screen display to exit the clean touch screen mode. The touch screen device will also exit the clean touch screen mode after a predetermined amount of time without input from the user.

6 Claims, 2 Drawing Sheets

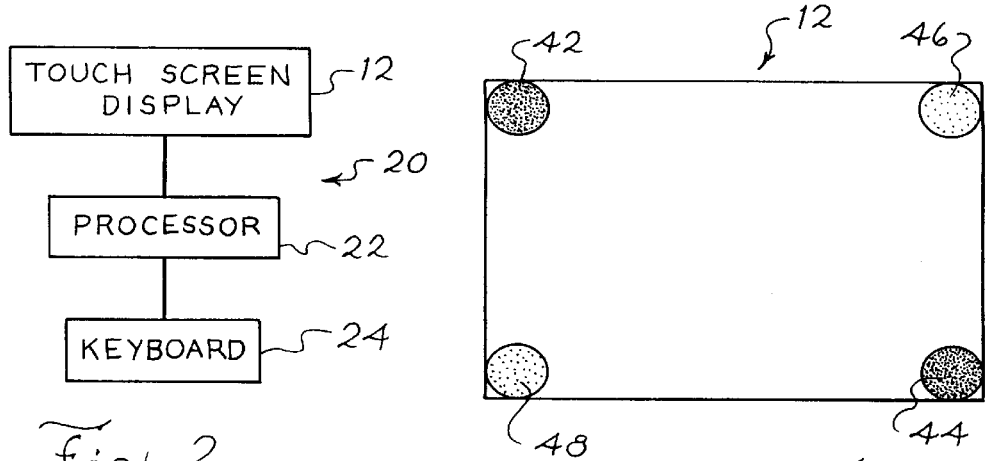
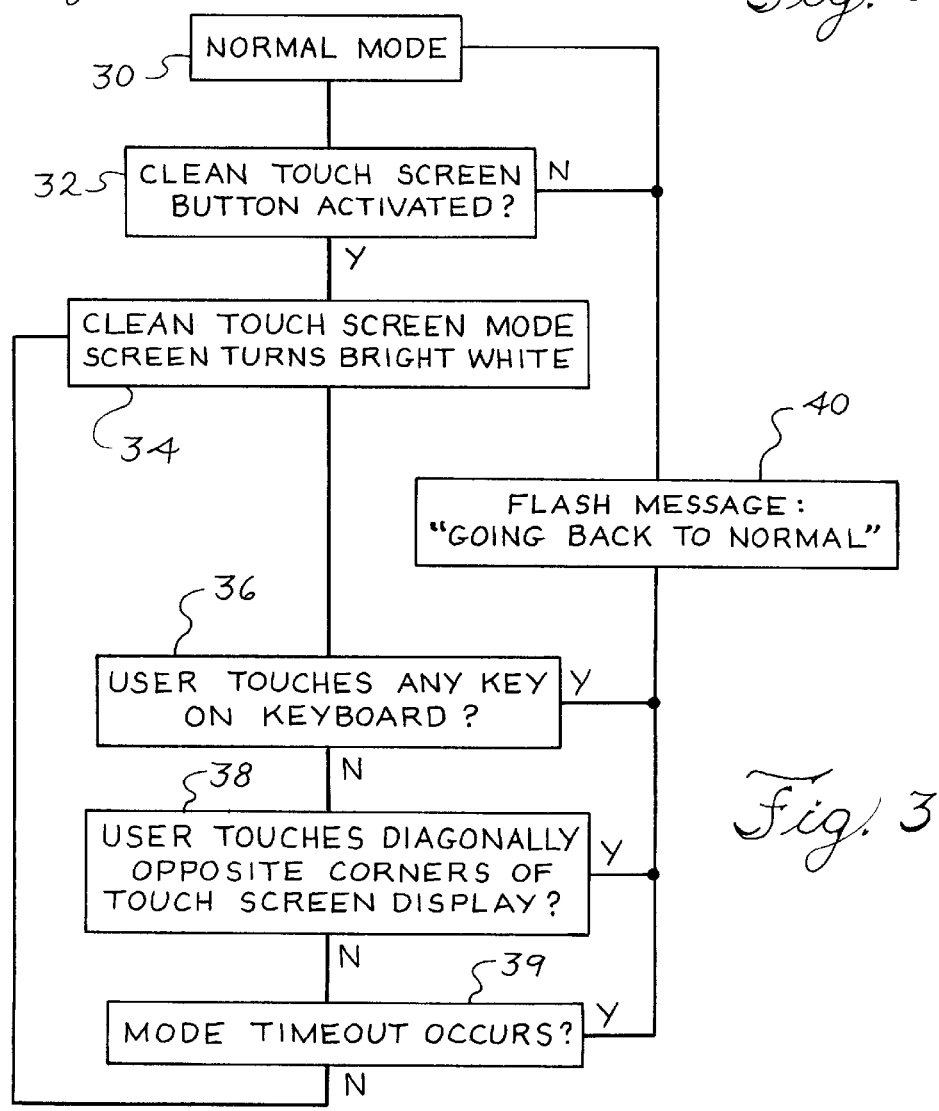

CLEANING TOUCHSCREENS

BACKGROUND

1. Field of the Invention

This invention relates generally to touch screen devices and particularly to a method of cleaning touch screen devices.

2. Related Art

In touch screen devices, touching the touch screen display activates features and/or inputs data. The touch screen display contains a visual display of buttons or other target areas that indicate to the user where to touch the touch screen display to activate certain features of the touch screen device or to input certain information.

Repetitive touching of the touch screen display results in a build up of oil and dirt on the surface of the touch screen display. Therefore, it is necessary to periodically clean the touch screen display. However, the touch screen display must be touched to clean it, therefore, the act of cleaning the touch screen display results in activation of the touch screen device. Correspondingly, inadvertent activation of features of the touch screen device or unwanted input of data results from cleaning the touch screen display.

In the past, touch screen displays have been cleaned by removing power from the touch screen display. Further, U.S. Pat. No. 5,526,422 (hereafter "'422 patent") describes a system and method for cleaning the touch screen display of a touch screen device contained on a telephone handset. In the '422 patent, the touch screen device enters a "clean screen" mode wherein the touch screen display is deactivated, however, information is kept on the touch screen display to provide status information to the users. This is not desirable because it is difficult to see where on the touch screen display there is oil and dirt, making it more difficult to clean the touch screen display. Furthermore, the touch screen device only exits from the "clean screen" mode when either the touch screen display has not been touched for a predetermined amount of time or when the telephone handset has transitioned from on-hook to off-hook. This is not desirable because the user may want to reactivate the touch screen display without the necessity of waiting a predetermined amount of time or waiting for the telephone handset to transition from on-hook to off-hook.

SUMMARY OF THE PRESENTLY PREFERRED EMBODIMENT

The present invention is directed to a touch screen device with a feature being that the user can deactivate the touch screen display to clean the touch screen display without inadvertently activating a feature or inputting unwanted data by touching the touch screen display. The touch screen display is deactivated by entering a clean touch screen mode by activating a button on the touch screen display. When the touch screen device is in the clean touch screen mode, the touch screen display does not register any touches of the touch screen display other than simultaneous touches of opposite corners of the touch screen display. Therefore, the user can clean the touch screen display without inadvertently activating a feature or inputting unwanted data by touching the touch screen display.

When the touch screen device is in the clean touch screen mode, the touch screen display turns bright white, illuminating any oil or dirt that may be on the touch screen display. This allows the touch screen display to be more easily cleaned because the user can see where the dirt and oil are located and clean accordingly.

The user can then exit the clean touch screen mode and reactivate the touch screen display by any one of three methods. The user can touch any key on a keyboard attached to the touch screen device to reactivate the touch screen display. The user can also touch any two diagonally opposite corners of the touch screen display simultaneously to reactivate the touch screen display. Finally, the user can wait for a predetermined length of time until the clean touch screen mode times out and the touch screen display reactivates. Because the user has a number of options to reactivate the touch screen, the user can reactivate the touch screen at his or her convenience and continue activating features of the touch screen device or inputting data through the touch screen display.

These and other features and advantages of the invention will be apparent upon consideration of the following detailed description of the preferred embodiments of the invention, taken in conjunction with the appended drawings.

BRIEF DESCRIPTION OF THE DRAWINGS

FIG. 2 is a block diagram, of a preferred embodiment of a touch screen device.

FIG. 3 is a flow chart for a preferred embodiment of a system of cleaning a touch screen display.

FIG. 4 is a diagrammatic view of a preferred embodiment touch screen display showing diagonally opposite corners that can be simultaneously touched to reactivate the touch screen display.

DETAILED DESCRIPTION OF THE PRESENTLY PREFERRED EMBODIMENTS

Figure 1:
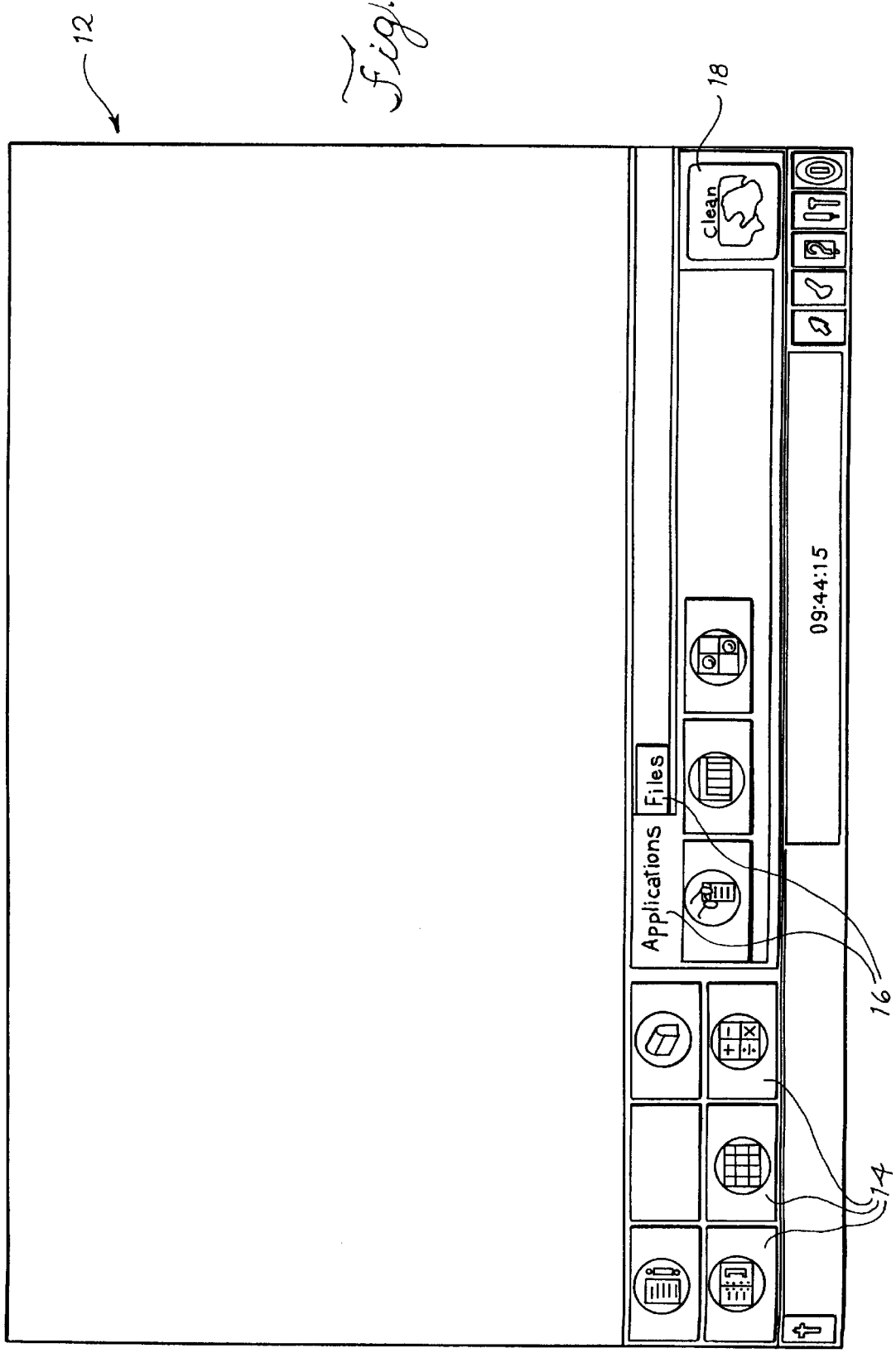
FIG. 1 is a front perspective view of a preferred embodiment of a touch screen display contained on a touch screen device.

Referring to FIG. 1, a touch screen display 12 is shown, also known as a touch sensitive screen. When the touch screen display 12 is in normal mode, it contains a visual display including buttons 14 and/or other target areas 16 where a user can touch the touch screen display 12 to activate features or input data. Including such buttons 14 and/or other target areas 16 and activating features or inputting data in response to touches of the touch screen display 12 is known in the art. One of the buttons included on the touch screen display 12 is the clean touch screen button 18, also known as a screen cleaning activation element. When the clean touch screen button 18 is activated, the touch screen display 12 exits the normal mode and enters a clean touch screen mode. When the touch screen display 12 is in the clean touch screen mode, the touch screen display 12 does not register any individual touches of the touch screen display 12. Therefore, the touch screen display 12 can be cleaned without inadvertently activating a feature or inputting unwanted data by touching the touch screen display 12.

When the touch screen display 12 enters the clean touch screen mode, the touch screen display 12 becomes a plain, single color, preferably bright white. By becoming bright white, dirt and oil on the touch screen display 12 become illuminated so that the touch screen display 12 can be more easily cleaned.

Referring to FIG. 2, a block diagram of a touch screen device 20 is shown. In the touch screen device 20, the touch screen display 12 is connected to a processor 22. The processor 22 receives input when areas of the touch screen display 12 are touched. The processor 22 also controls what is shown on the touch screen display 12, including the location of the buttons 14 and/or other target areas 16 contained on the touch screen display 12. A keyboard 24 is also connected to the processor 22. The processor 22 also accepts input from keystrokes on the keyboard 24.

Referring to FIG. 3, a flow chart for a preferred embodiment of the present invention is shown. The touch screen device 20 is generally in the normal mode 30 wherein the buttons 14 and/or other target areas 16 (as shown in FIG. 1) can be touched to activate features or input data. In step 32, the touch screen device 20 determines whether the user is touching the clean touch screen button 18. If the user touches the clean touch screen button 18, the touch screen enters the clean touch screen mode 34. While the touch screen display 12 is in the clean touch screen mode 34, the touch screen display 12 turns a bright color, preferably white. The light or white color is placed on the touch screen display 12 by either writing a light or white color to the touch screen display 12 or adjusting the contrast and brightness of the touch screen display 12 so that the touch screen display 12 appears white. The user can then clean the touch screen display 12, preferably by wiping the touch screen display 12 with a cloth.

The touch screen device 20 remains in the clean touch screen mode 34 until further input is received from the user, or until a predetermined amount of time has elapsed. In a preferred embodiment, the user input can comprise the user depressing a key on the keyboard 24 or the user simultaneously touching two separate locations on the touch screen display 12 that are of a sufficient distance apart that they will not be touched simultaneously while cleaning the touch screen display 12, such as two diagonally opposite corners of the touch screen display 12.

In step 36, the touch screen device 20 determines whether the user is depressing any key on the keyboard 24. If the user is depressing any key on the keyboard 24, the touch screen device 20 exits the clean touch screen mode 34 and returns to normal mode 30. If the user is not depressing any key on the keyboard 24, the touch screen device 20 moves to step 38. In step 38, the touch screen device 20 determines whether the user is simultaneously touching opposite corners of the touch screen display 12. If the user is simultaneously touching opposite corners of the touch screen display 12, the touch screen device 20 exits the clean touch screen mode 34 and returns to normal mode 30. If the user is not simultaneously touching opposite corners of the touch screen display 12, the touch screen device 20 moves to step 39.

In a preferred embodiment, a clean touch screen mode timeout is included. In step 39, if the user does not perform one of the actions to exit the clean touch screen mode described above, the touch screen device 20 determines if a predetermined amount of time has elapsed since entering the clean touch screen mode 34. The touch screen device determines whether the predetermined amount of time has elapsed either by utilizing a counter circuit or a software program to measure elapsed time, both of which are known in the art. If the predetermined amount of time has elapsed, the touch screen device 20 will automatically exit the clean touch screen mode 34. If the predetermined amount of time has not elapsed, the touch screen device 20 returns to the clean touch screen mode 34 and begins the cycle again.

When the touch screen display 12 exits the clean touch screen mode 34, the touch screen device 20 performs step 40 wherein the touch screen display 12 will display the message "Going Back To Normal Mode" for a predetermined amount of time to notify the user that the touch screen display 12 is exiting the clean touch screen mode 34. This will prevent inadvertent touches of the touch screen display 12 after the touch screen display 12 has been reactivated.

Referring to FIG. 4, a diagrammatic view of a preferred embodiment touch screen display 12 is shown. Included are the areas of the diagonally opposite corners 42, 44, 46 and 48 that can be simultaneously touched to reactivate the touch screen display 12 when the touch screen display 12 is in the clean touch screen mode 34. The clean touch screen mode 34 is exited and the touch screen display 12 is reactivated when the user simultaneously touches either corners 42 and 44 or corners 46 and 48.

It is to be understood that a wide range of changes and modifications to the embodiments described above will be apparent to those skilled in the art and are contemplated. It is, therefore, intended that the foregoing detailed description be regarded as illustrative rather than limiting, and that it be understood that it is the following claims, including all equivalents, that are intended to define the spirit and scope of the invention.

What is claimed is:

1. A method for cleaning a touch sensitive screen, comprising the steps of:
   disabling an active touch screen mode and enabling a touch screen cleaning mode;
   displaying a uniform bright color over the entire screen when the touch screen cleaning mode is enabled;
   disabling active screen responses when the touch screen cleaning mode is enabled;
   locating at least two deactivation touch sensitive areas at corners of the screen, said deactivation touch sensitive areas also being set the same uniform bright color;
   pressing said deactivation areas; and
   disabling the touch screen cleaning mode and enabling the active touch screen mode and active screen responses when said deactivation areas are pressed.

2. The method of claim 1, further including the step of using bright white as said uniform bright color.

3. The method of claim 2, further including the step of defining deactivation touch sensitive areas at opposite diagonal corners of said screen.

4. The method of claim 1, further including the step of defining deactivation touch sensitive areas at opposite diagonal corners of said screen.

5. The method of claim 1, further including the step of displaying an active screen warning message on the screen when the cleaning mode is disabled.

6. A method for cleaning a touch sensitive screen, comprising the steps of:
   disabling an active touch screen mode and enabling a touch screen cleaning mode;
   displaying the screen as a plain, single color when the touch screen cleaning mode is enabled;
   disabling active screen responses when the touch screen cleaning mode is enabled;
   locating at least two deactivation touch sensitive areas at corners of the screen, said deactivation touch sensitive areas also being set the same plain, single color;
   pressing said deactivation areas; and
   disabling the touch screen cleaning mode and enabling the active touch screen mode and active screen responses when said deactivation areas are pressed.

* * * * *